US012683946B2

(12) United States Patent
Ziolkowski

(10) Patent No.: US 12,683,946 B2
(45) Date of Patent: Jul. 14, 2026

(54) USER AUTHENTICATION USING SECURE INFRASTRUCTURE

(71) Applicant: U.S. Bank National Association, Minneapolis, MN (US)

(72) Inventor: Christopher Ziolkowski, Burnsville, MN (US)

(73) Assignee: U.S. Bank National Association, Minneapolis, MN (US)

( * ) Notice: Subject to any disclaimer, the term of this patent is extended or adjusted under 35 U.S.C. 154(b) by 0 days.

(21) Appl. No.: 19/540,849

(22) Filed: Feb. 16, 2026

(65) Prior Publication Data

US 2026/0180971 A1 Jun. 25, 2026

Related U.S. Application Data

(63) Continuation of application No. 18/617,319, filed on Mar. 26, 2024, now Pat. No. 12,580,904.

(51) Int. Cl.
| | |
|---|---|
| *H04L 9/40* | (2022.01) |
| *G06Q 20/36* | (2012.01) |
| *G06Q 20/40* | (2012.01) |
| *H04L 9/30* | (2006.01) |

(52) U.S. Cl.
CPC ............. *H04L 63/08* (2013.01); *G06Q 20/36* (2013.01); *G06Q 20/4012* (2013.01); *H04L 9/30* (2013.01); *H04L 63/0853* (2013.01); *H04L 63/0884* (2013.01); *G06Q 2220/00* (2013.01)

(58) Field of Classification Search
CPC ...................................................... H04L 63/08
See application file for complete search history.

(56) References Cited

U.S. PATENT DOCUMENTS

| | | | |
|---|---|---|---|
| 3,938,091 A | 2/1976 | Atalla et al. | |
| 2003/0177094 A1 | 9/2003 | Needham et al. | |
| 2007/0016527 A1* | 1/2007 | Lyons ................... | H04L 63/205 |
| | | | 705/44 |
| 2007/0219753 A1 | 9/2007 | Markwitz et al. | |
| 2008/0249947 A1 | 10/2008 | Potter | |
| 2009/0100260 A1 | 4/2009 | Govindarajan | |
| 2013/0104202 A1* | 4/2013 | Yin ......................... | G06F 21/42 |
| | | | 726/5 |
| 2013/0198019 A1 | 8/2013 | Smith | |
| 2014/0114776 A1 | 4/2014 | Solanki et al. | |
| 2014/0310779 A1 | 10/2014 | Lof et al. | |
| 2015/0026026 A1 | 1/2015 | Calman et al. | |
| 2015/0026056 A1 | 1/2015 | Calman et al. | |

(Continued)

OTHER PUBLICATIONS

Amoretti, Michele et al.; Blockchain-based Proof of Location, Department of Engineering and Architeture—University of Parma, Italy; Feb. 24, 2020; 13 Pages.

(Continued)

*Primary Examiner* — Bradley W Holder
(74) *Attorney, Agent, or Firm* — Merchant & Gould P.C.

(57) ABSTRACT

A process for validating a user using existing secure infrastructure, such as Automated Teller Machines (ATMs). The process can be modified to incorporate further aspects that verify information about a user (e.g., an identifier of a user, a location of the user) or verifying capabilities of a user (e.g., ability to receive messages via a communication channel, such as a telephone number, email address, or mailing address).

16 Claims, 4 Drawing Sheets

(56) References Cited

U.S. PATENT DOCUMENTS

| | | | |
|---|---|---|---|
| 2015/0193781 A1 | 7/2015 | Dave et al. | |
| 2015/0227731 A1 | 8/2015 | Grigg et al. | |
| 2015/0227926 A1 | 8/2015 | Grigg et al. | |
| 2015/0229624 A1 | 8/2015 | Grigg et al. | |
| 2015/0229625 A1 | 8/2015 | Grigg et al. | |
| 2015/0229650 A1 | 8/2015 | Grigg et al. | |
| 2016/0055326 A1 | 2/2016 | Votaw et al. | |
| 2016/0055487 A1 | 2/2016 | Votaw et al. | |
| 2016/0057144 A1 | 2/2016 | Grigg et al. | |
| 2016/0155189 A1 | 6/2016 | Grigg et al. | |
| 2016/0156609 A1 | 6/2016 | Grigg et al. | |
| 2016/0162896 A1 | 6/2016 | Grigg et al. | |
| 2017/0195341 A1* | 7/2017 | Metz | G06Q 20/202 |
| 2018/0167208 A1* | 6/2018 | Le Saint | H04L 63/0442 |
| 2018/0330385 A1 | 11/2018 | Johnson et al. | |
| 2019/0222424 A1 | 7/2019 | Lindemann | |
| 2019/0303553 A1 | 10/2019 | Choiniere et al. | |
| 2019/0318070 A1 | 10/2019 | Mitic et al. | |
| 2019/0325120 A1 | 10/2019 | Fritzon et al. | |
| 2019/0327225 A1 | 10/2019 | Wahlberg et al. | |
| 2020/0175434 A1 | 6/2020 | Wisniewski | |
| 2020/0177393 A1 | 6/2020 | Lopez et al. | |
| 2020/0184048 A1 | 6/2020 | Toth et al. | |
| 2020/0184050 A1 | 6/2020 | Toth et al. | |
| 2021/0264005 A1 | 8/2021 | Toth et al. | |
| 2022/0101651 A1 | 3/2022 | Tanifuji et al. | |

OTHER PUBLICATIONS

Coalition for Content Provenance and Authenticity—C2PA Technical Specification (1.0, Jul. 26, 2022: Release); 140 Pages.
Kalogirou, Vasilis; What is the "proof of location" and why it matters—An introduction to the Proof of Location; Medium; May 10, 2020; 6 Pages.
Proof of Personhood (PoP)—Worldcoin Whitepaper; Printed Feb. 5, 2024; 23 Pages.
USPS® In-Person Identity Proofing; https://faq.usps.com/s/article/USPS-In-Person-Identity-Proofing; Oct. 17, 2023; 3 Pages.
Davos-Klosters, Switzerland; White Paper—Digital Identity—On the Threshold of a Digital Identity Revolution (World Economic Forum); Jan. 23-26, 2018; 18 Pages.
The Role of the Postal Service in Identity Verification—Report No. FISC-WP-22-006; May 1, 2022, 29 Pages.

\* cited by examiner

USER AUTHENTICATION USING SECURE INFRASTRUCTURE

CROSS-REFERENCE TO RELATED APPLICATIONS

This application is a continuation of and claims priority to U.S. patent application Ser. No. 18/617,319, filed Mar. 26, 2024, the entirety of which is hereby incorporated by reference.

BACKGROUND

Many services require users to authenticate themselves with usernames and passwords. However, authentication can be vulnerable due to password reuse, leaks, or other issues. A desire to increase security has led to multi-factor authentication involving use of security token generators, phone-based authenticators, and others. Further, some systems incorporate or could benefit from a user's location in determining authentication or permission. However, there remain challenges in the art in efficiently ensuring that users are who they say they are and are located where they say they are.

DETAILED DESCRIPTION

Figure 1:
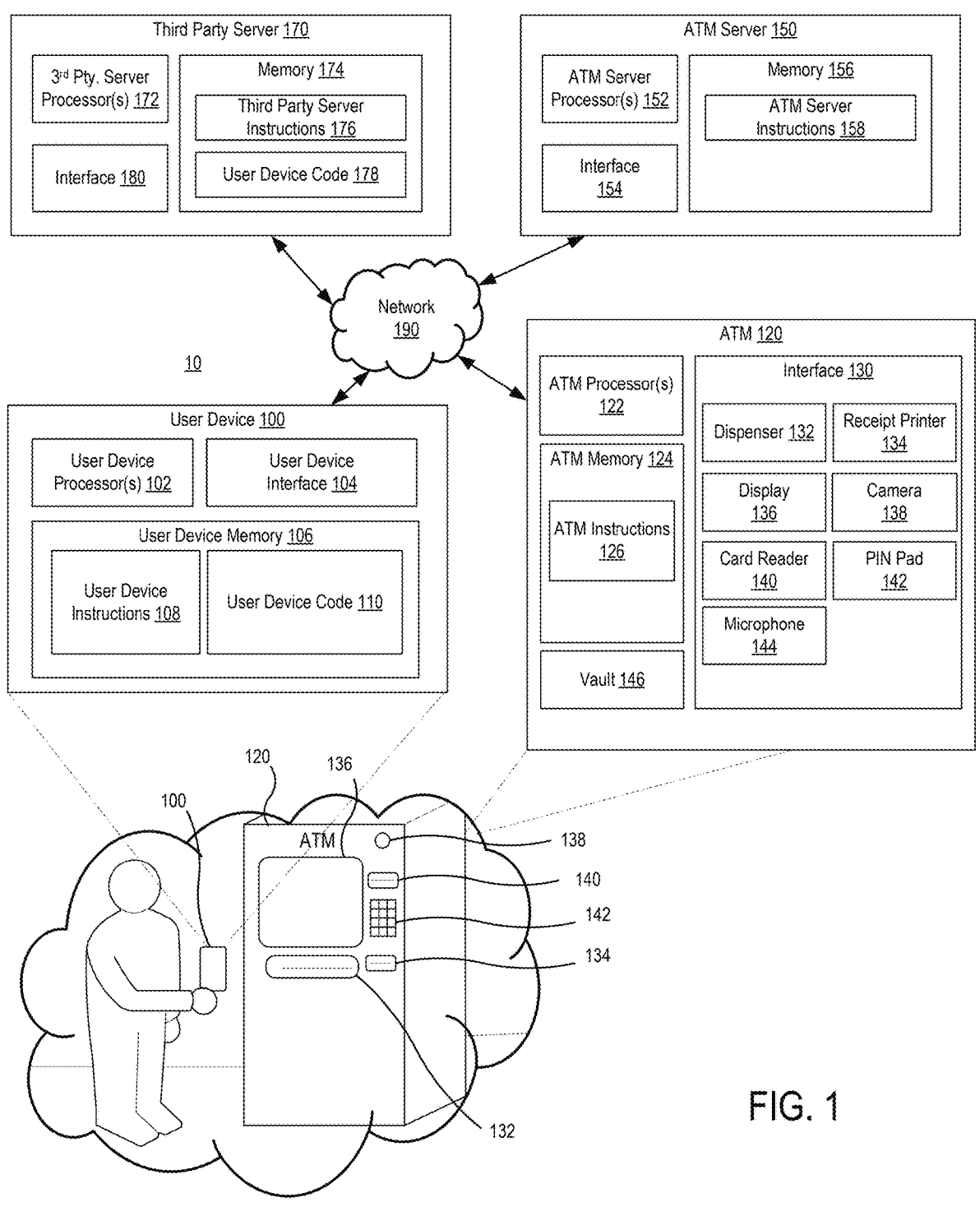
FIG. 1 illustrates a system that can benefit from technologies described herein.

Disclosed examples include a process for demonstrating a user's location using existing secure infrastructure, such as Automated Teller Machines (ATMs). The processes can be modified to incorporate further aspects that verify information about a user (e.g., an identifier of a user) or verifying capabilities of a user (e.g., ability to receive messages via a communication channel, such as a telephone number, email address, or mailing address).

The usage of existing secure infrastructure for authentication rather than bespoke infrastructure can help reduce a potential chicken-and-egg problem where people do not use bespoke physical authenticators because they're not common but they are not common because not enough people use them. Further, existing secure infrastructure is secure for existing business reasons and authentication of the kind described herein can ride along on such security without significant additional costs or resources and can benefit from existing customer trust in the process. Further still, the incorporation of an ATM or similar device into the security process leverages existing significant prior authentication of users of ATMs (e.g., to comply with local regulations, such as know your customer laws). And ATMs are ubiquitous, do not require attendants, and are often accessible during a wider range of hours than traditional banks. Thus, ATMs present an excellent platform from which to build authentication.

However, there are also technical challenges in using ATMs and other existing secure devices for authentication. ATMs are designed to be physically and digitally secure, which limits the ability to introduce new software, hardware, or connectivity. Further, even if such changes could be made, the ubiquity and diversity of ATMs can make intro-ducing changes to a critical mass of ATM hardware or software to support authentication difficult (thereby creating a chicken-and-egg problem). Techniques described herein can be relevant to overcoming these technical challenges, such as by introducing features (e.g., read-only features) that piggyback on existing infrastructure at backend hubs.

While many examples herein are described in the context of ATMs, a person of skill in the art will understand with the benefit of this disclosure how techniques herein can be applied to other devices or contexts.

In an example implementation, a service wants a user to demonstrate that the user corresponds to a real person that is physically present in a specific location. The service generates a code specific to that user or that demonstration session. The service provides the code to the user via a message or app associated with the service. The user goes to an ATM and authenticates with the ATM in a traditional way (e.g., by inserting a card and entering a personal identification number). While authenticated in the session, the user provides the code to the ATM, such as by pulling out their phone and revealing the code (e.g., in the form of a QR code) to the ATM's security camera. Software monitoring the ATM security feed identifies the revealed code. Responsive to identifying the revealed code, the software determines whether an individual was accessing that monitored ATM at the time the QR code is visible. If so, the code is combined with an identifier of the user (or a hash thereof, depending on privacy settings). The combination is signed by a private key corresponding to the ATM associated with the security feed. The signed combination is then made accessible to the third party (e.g., by publishing it to a blockchain, by communicating it to the user via a communication method on file with the bank, making it accessible over an API, via other techniques, or combinations thereof). In some examples, the module causes the ATM to print a receipt having the signed combination thereon (e.g., encoded in a QR code) for the user to provide to the third party.

The third party then uses the information in the signed combination to determine that: (1) the user is tied to an authenticated unique user id (the identifier or a hash of their bank identifier) and (2) that was present at a specific physical location (e.g., based on verifying the signature using a public key of the ATM). Where the unique user ID is a hash of an identifier of the user, no identifying information of the user is disclosed to the third party. So, anonymity of the user is preserved while demonstrating that they correspond to a real person that was at the location of that ATM. This correspondence to a real person is bolstered by the rigorous requirements placed on financial institutions in creating an account for a user. The third party could determine what entity signed the signed combination and infer what level of rigor was applied to giving an account to that user. Further, because the authentication is tied to an identifier of the user (whether or not the third party knows the identity of the user), if that user abuses the system (e.g., by renting out authentication to others), that identifier can be added to an exclude list of identifiers not to trust. The onerous requirements of creating an account with a financial institution reduces the likelihood of malicious users creating multiple accounts at multiple financial institutions to abuse the system. Beneficially, this example process requires no modification of existing ATM hardware or software infrastructure other than having an additional process monitoring security feeds. Meanwhile, the burden on the user is little more than the inconvenience of going to a nearby ATM.

That example implementation is one of many that a person of skill in the art can implement having benefit of the disclosure herein. Variations are possible. For example, a weaker form of authentication can exist where the user is not authenticated to the ATM (e.g., just proving that someone showed the QR code at the location). In another example, rather than providing the code through a security or monitoring system of the ATM, the code can be provided directly through the ATM itself. For instance, the ATM may be modified to receive codes directly or existing ATM functionality can be used in an unintended way to provide the code. The user can provide the code through a typical ATM interaction that does not have a substantial effect on the user's finances. For instance, depending on how the ATM logs interactions, it may be possible for a user to provide the code when prompted for their PIN. This would most likely generate an error and the provided code may appear in a log associated with the ATM. The log can be monitored for provided PINs having a form corresponding to authentication codes. The finding of such a code can trigger the authentication process. Such an event can be combined with the user properly entering their PIN and authenticating with the ATM after entering the code. Such a login can be assumed to be the person that provided the incorrect PIN (but correct code) and used as part of the authentication process. In other examples, the code can be provided in another field where the user is prompted to insert a number (e.g., an amount of money to withdraw or transfer). In further examples, the code can be a set of actions rather than characters. For example, the code could be instructions to the user to perform certain actions, such as requesting a balance inquiry for a checking account a certain number of times in a row, transferring a specific amount between accounts or other actions. Detecting such actions in a log can be used as an indication that a code is being provided. In a still further example, the third party could provision a virtual payment card or other items storable in a digital wallet or a physical payment card. Such an item can be provided to the user. The user can then use that provided item at the ATM (e.g., where the ATM supports receiving such digital wallet items such as via near field communication).

In example variations, ATMs are able to be modified to support an authentication process. For example, ATMs may be modified for creating specialty hardware that can be present in bank branches for authentication. In a particular example, the ATMs could be modified to have hardware scanners configured to scan or otherwise receive the codes. For instance, rather than the user showing a QR code to the security camera, the ATM can print a receipt having QR code representing a signed hashed ID of the user. In addition or instead, some interactions or operations described herein as being performed by an ATM can be performed or mediated by a teller or other individual at a bank branch or other location. Further, while many examples described herein are directed to ATMs and financial institutions, a person of skill in the art will understand that techniques described herein can applied to other kinds of devices and infrastructure, such as government infrastructure, vending machine infrastructure, public transit infrastructure (e.g., ticket or transit card issuance kiosks or payment stations). Further, certain jurisdictions may have different banking regulations, norms, or other kinds of ATMs that may enhance or detract from techniques described herein. A person of skill in the art with that relevant jurisdiction can modify techniques described herein accordingly to suit local requirements.

An example system that can be used according to examples herein is described in FIG. 1.

FIG. 1 illustrates a system 10 configured for authentication of a user at a location. The system includes a user device 100, an ATM 120, an ATM server 150, and a third-party server 170 all connected by a network 190.

The user device 100 is a device used by a user that participates in the authentication process. The user device 100 can include one or more aspects described elsewhere herein such as in reference to the computing environment 300 of FIG. 3. In many examples, the user device 100 is a personal computing device, such as a smart phone, wearable, tablet, laptop computer, desktop computer, virtual reality device, extended reality device, mixed reality device, or an augmented reality device. But the device 100 need not be so limited and may instead encompass other devices used by a user as part of the authentication process. In the illustrated example, the user device 100 can include one or more user device processors 102, one or more user device interfaces 104, and user device memory 106, among other components.

The one or more user device processors 102 are one or more components of the user device 100 that execute instructions, such as instructions that obtain data, process the data, and provide output based on the processing. The one or more user device processors 102 can include one or more aspects described below in relation to the one or more processors 312 of FIG. 3.

The one or more user device interfaces 104 are one or more components of the user device 100 that facilitate receiving input from and providing output to something external to the user device 100. The one or more user device interfaces 104 can include one or more aspects described below in relation to the one or more interfaces 318 of FIG. 3.

The user device memory 106 is a collection of one or more components of the user device 100 configured to store instructions and data for later retrieval and use. The user device memory 106 can include one or more aspects described below in relation to the memory 314 of FIG. 3. The user device memory 106 can store user device instructions 108 and the user device code 110.

The client instructions 112 are a set of instructions that, when executed by one or more of the one or more user device processors 102, cause the one or more user device processors 102 to perform an operation described herein, such as part of the authentication process. In examples, the instructions 112 can be those of a mobile application (e.g., that may be obtained from a mobile application store, such as the APPLE APP STORE or the GOOGLE PLAY STORE) independent from or associated with the third party having the third-party server 170. The mobile application can provide a user interface for receiving user input from a user and acting in response thereto. Such a response can include providing data indicative of or based on the user input to a relevant server (e.g., using an application programming interface thereof). The user interface can further provide output to the user. In some examples, the client instructions 112 are instructions 112 that cause a web browser of the user device 100 to render a web page associated with the authentication process. The web page may present information to the user and be configured to receive input from the user and take actions in response thereto.

The ATM 120 is an automated teller machine. An automated teller machine is a special purpose, self-service machine that accepts or dispenses cash directly to users. ATMs typically also permit users to engage in financial transactions, such as inquiring about a balance or transferring funds between accounts. An ATM is an example of a secure device, as described herein. In the illustrated example, the ATM 120 includes one or more ATM processors 122, ATM memory 124, an interface 130 and a vault 146.

The one or more ATM processors 122 are one or more components of the ATM 120 that execute instructions, such as instructions that obtain data, process the data, and provide output based on the processing. The one or more ATM processors 122 can include one or more aspects described below in relation to the one or more processors 312 of FIG. 3.

The ATM memory 124 is a collection of one or more components of the ATM 120 configured to store instructions and data for later retrieval and use. The ATM memory 120 can include one or more aspects described below in relation to the memory 314 of FIG. 3. The ATM memory 120 can store ATM instructions 126 and code 128.

The ATM instructions 126 are instructions that, when executed by the one or more processors 122, cause the one or more processors 122 to provide functionality related to the ATM.

The one or more ATM interfaces 130 are one or more components of the ATM 120 that facilitate receiving input from and providing output to something external to the ATM 120. The one or more user ATM interfaces 130 can include one or more aspects described below in relation to the one or more interfaces 318 of FIG. 3. In examples of the present disclosure, ones of the interfaces may be utilized as a security device that is used in conjunction with, or associated with, the secure device (ATM). In the illustrated example, the interface 130 includes components such as a dispenser 132, a receipt printer 134, a display 136, a camera 138, a card reader 140, and a PIN pad 142.

The dispenser 132 is a component of the ATM 120 that is configured to dispense cash to a user of the ATM 120. In an example, the one or more ATM processors 122 execute instructions that cause the dispenser 132 to obtain or receive a selected amount of cash from the vault 146 and provide the selected amount of cash to the user.

The receipt printer 134 is a component of the ATM 120 that is configured to print a receipt and provide the receipt to the user. For example, the one or more ATM processors 122 execute instructions that cause the receipt printer 134 to print information on the receipt.

The display 136 is a component configured to provide visual output to a user. In some examples, the display 136 is touch sensitive and capable of receiving input from a user.

The camera 138 is a component configured to produce data based on a visual environment of interest. In many implementations, the data encodes images or a series of images forming video representative of the visual environment. In examples herein, the camera 138 can be a security camera disposed to monitor activity associated with the ATM, such as activity in an area associated with a person using the ATM.

The card reader 140 is a component configured to read data from a card usably disposed proximate the card reader 140. In some examples, the card reader 140 physically receives a card and reads a magnetic strip, chip, or another component of the card. The data produced by the card reader 140 can be provided to the one or more ATM processors 122 for usage in performing operations of the ATM (e.g., accessing a financial account associated with the card). In some examples, the card reader 140 reads the card using wireless technology, such as using near field communication.

The PIN pad 142 is a component configured to receive a PIN from a user and associated input. The PIN pad 142 can take any of a variety of forms depending on how the ATM

120 is configured. In many examples, a PIN pad 142 includes not only a number pad but also buttons corresponding to other values or features, such as cancel, accept, and clear input. In some examples, the PIN pad 142 includes security features configured to protect information received from the user via the PIN pad 142.

The microphone 144 is a component configured to produce data based on sounds in an audible frequency range occurring in an environment of interest. Typically, the audible frequency range for the microphone 144 is the same as the audible frequency range of a human (approximately 20 Hz to 20 kHz). Though in some examples, the audible frequency range of the microphone 144 includes portions above or below this range. In many implementations the microphone 144 may include a transducer configured to generate audio data to be provided to the one or more ATM processors 122. The microphone 144 may be controlled, for example, by the one or more ATM processors 122 to capture audio data during other interactions with the ATM (e.g., during a user transaction depositing/withdrawing funds, accessing account data, and the like), which may be stored in memory therein and/or transmitted remotely therefrom.

The vault 146 is a compartment within the ATM 120 that stores cash and, optionally, other items benefitting from high security (e.g., deposited checks). The vault may be made from reinforced materials and be configured to resist higher amounts of tampering than other components of the ATM 120. The vault 146 can be configured such that cash can leave the vault and be sent to the dispenser 132.

In some examples, the ATM 120 includes fasteners durably securing the ATM 120 in place, such as by being bolted to a floor on which the ATM 120 sits.

The ATM server 150 is a server device that functions as part of the authentication process and is associated with the ATM 120. The ATM server 150 is an example of a secure device server, in accordance with example aspects of the present disclosure. In the illustrated example, the ATM 150 includes one or more ATM server processors 152, one or more ATM server interfaces 154, and ATM server memory 156, among other components.

The one or more ATM server processors 152 are one or more components of the ATM server 150 that execute instructions, such as instructions that obtain data, process the data, and provide output based on the processing. The one or more ATM server processors 152 can include one or more aspects described below in relation to the one or more processors 312 of FIG. 3.

The one or more ATM server interfaces 154 are one or more components of the ATM server 150 that facilitate receiving input from and providing output to something external to the ATM server 150. The one or more user ATM server interfaces 154 can include one or more aspects described below in relation to the one or more interfaces 318 of FIG. 3.

The ATM server memory 156 is a collection of one or more components of the ATM server 150 configured to store instructions and data for later retrieval and use. The ATM server memory 156 can include one or more aspects described below in relation to the memory 314 of FIG. 3. The ATM server memory 156 can store ATM server instructions 158.

The ATM server instructions 158 are instructions that, when executed by the one or more processors 152, cause the one or more processors 152 to provide functionality related to the authentication.

The ATM server instructions 158 are instructions that, when executed by the one or more processor 152, cause the one or more processors 152 to participate in the authentication process.

The third-party server 170 is a server device associated with a third party. In the illustrated example, the third-party server 170 includes one or more third-party server processors 172, one or more third-party server interfaces 174, and third-party server memory 170, among other components.

The one or more third-party server processors 172 are one or more components of the third-party server 170 that execute instructions, such as instructions that obtain data, process the data, and provide output based on the processing. The one or more third-party server processors 172 can include one or more aspects described below in relation to the one or more processors 312 of FIG. 3.

The one or more third-party server interfaces 174 are one or more components of the third-party server 170 that facilitate receiving input from and providing output to something external to the ATM server 150. The one or more user third-party server interfaces 174 can include one or more aspects described below in relation to the one or more interfaces 318 of FIG. 3.

The third-party server memory 174 is a collection of one or more components of the third-party server 170 configured to store instructions and data for later retrieval and use. The third-party server memory 174 can include one or more aspects described below in relation to the memory 314 of FIG. 3. The third-party server memory 174 can store third-party server instructions 176 and user device code 178.

The third-party server instructions 176 are instructions that, when executed by the one or more processors 172, cause the one or more processors 172 to provide functionality related to the authentication.

The third-party server instructions 176 are instructions that, when executed by the one or more processor 172, cause the one or more processors 172 to participate in the authentication process.

The network 190 is a set of devices that facilitate communication from a sender to a destination, such as by implementing communication protocols. Example networks 190 include local area networks, wide area networks, intranets, or the Internet.

Method

Figure 2:
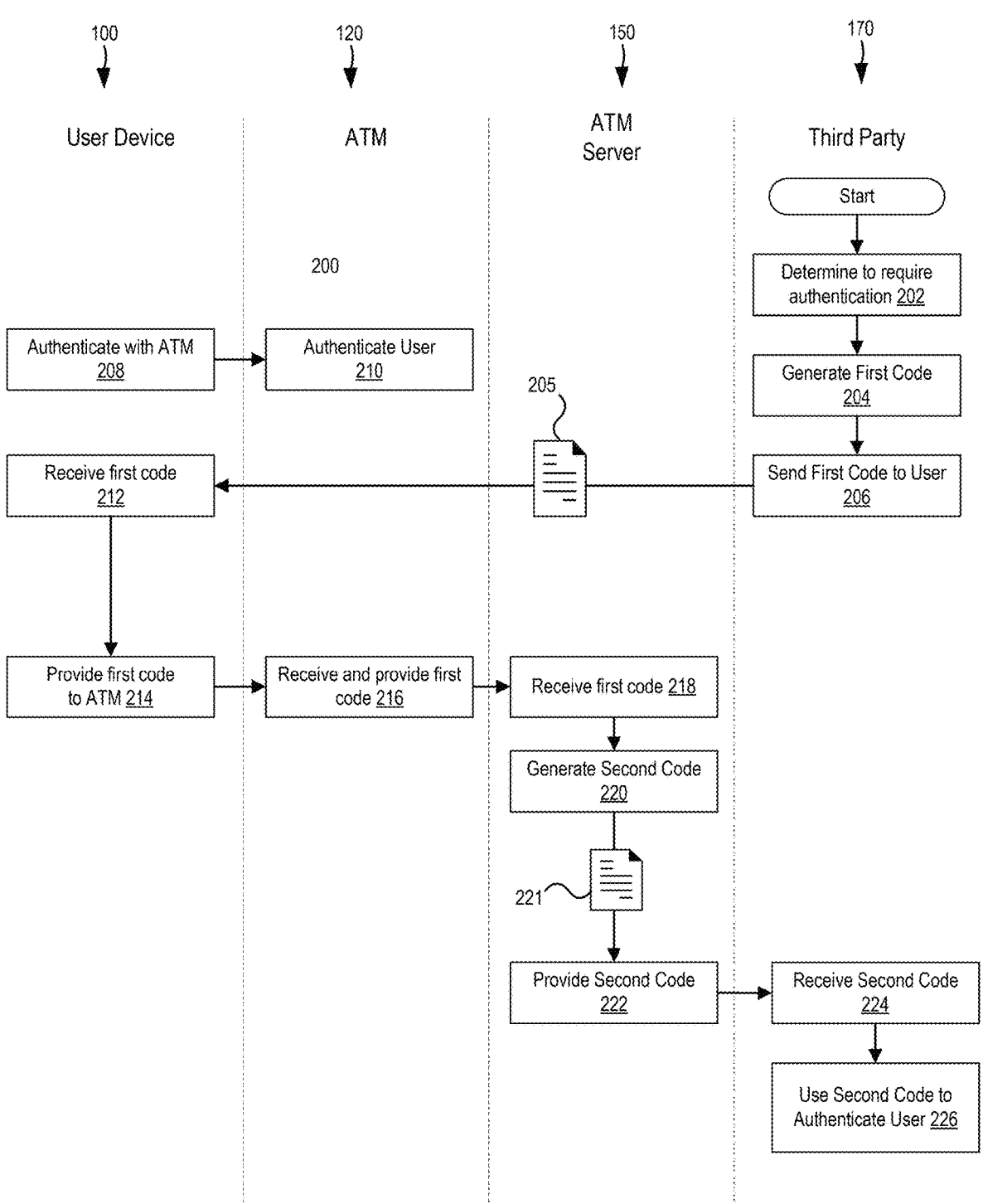
FIG. 2 illustrates an example method.

FIG. 2 illustrates an example method 200. The method 200 can begin with operation 202.

Operation 202 includes the third party determining to require authentication. This can be in response to detecting any of a variety of circumstances. The determination can be in response to: detecting a login request from the user, in response to detecting a create account request from the user, in response to detecting a change to security or privacy settings from the user (e.g., changing settings relating to two factor authentication), in response to detecting a change to payment or billing settings (e.g., an account to which payments for the user are to be made), detecting a password recovery request from the user, in response to detecting an account deletion request from the user, in response to detecting a request to add another device to the account, in response to detecting potential fraud in relation to the user's account, in response to detecting potential misuse of the user's account, in response to detecting inauthentic behavior with the user's account, in response to detecting an unusual login location for the user, in response to detecting other occurrences, in response to detecting a request requiring a user be in a particular location (e.g., for legal or compliance purposes), in response to requiring age verification, in response to detecting a personal data request (e.g., under GDPR or another law), or combinations thereof. In some examples, the determination to require authentication occurs periodically (e.g., every so many days), such as to demonstrate that a user is in a particular area. After operation 202, the flow of the method 200 can move to operation 204.

Operation 204 includes generating a first code 205. The first code 205 can take any of a variety of forms depending on desired implementation. In many examples, the first code 205 is a series of characters that are specific to the user. In an example, the characters are generated by hashing the user's name or another piece of data associated with the user. In an example, the first code can be a series of randomly or pseudorandomly selected characters.

In some examples, the first code 205 can further include portions representing the kind of processing wanted by the third party. For example, the first code 205 can include portions corresponding to the information wanting to be verified for the user. That information may include information that may be on file at the financial institution associated with the user, such as the user's legal name, address, phone number, email address, age, account status (joint or individual), other information, or combinations thereof. In some examples, the first code further includes information about how the third party wants to receive the second code (see below). In still further examples, the first code 205 can include a portion demonstrating that the third party is authorized to use the authentication method (e.g., by including a license key or a portion determined based on a license key). The first code 205 can further include an identifier of the third party. In some examples, this information is provided by or encoded within the first code 205 itself or is provided in a communication that also includes the first code 205.

Operation 206 includes sending the first code 205 to the user device. The first code 205 can be sent in plaintext to the user device or it can be encoded in any useful format. For example, the first code 205 can be encoded a static visual form, such as a bar code (e.g., a QR code, visual data matrix, other codes, or combinations thereof), that is then revealed to the security camera. In addition to or instead of the first code 205 being encoded in a static form (e.g., a bar code that does not change over time), the first code 205 can be encoded in a dynamic form that changes over time. For example, the first code can be encoded in a series of changing brightness, colors, or other forms. Such an encoding can be based on morse code or another technique. The encoding in dynamic form can be beneficial where the quality of the camera is poor or unknown. In addition or instead, the first code 205 can be encoded in a non-visual format, such as audio using any of a variety of known techniques for encoding data into an audio signal.

Operation 212 includes the user device 100 receiving the first code 205. This can be done in any of a variety of ways. In some instances, the code arrives from the third party server 170 in a way that is already encoded (e.g., in a visual or audio medium) and need only be provided by the mobile device (e.g., using a display or other interface of the user device 100).

In an example, the first code 205 is deliberately received through a communications medium separate from the mobile application so as to verify the existence or correctness of user provided communication information (e.g., email address or phone number).

In another examples, the first code 205 is received within an application running on the mobile device that is associated with the third party. In an example, the user may be logged into the application using their credentials with the service. For example, the service may be a service that also provides mobile applications. The first code 205 can be received through the mobile application of the service. This approach can provide benefits. For example, providing the code through the application can further incorporate an additional layer of security as part of the authentication process, such as by requiring the user to be logged in to the application when the application is used to provide the first code 205 to the ATM. Providing the code through the application can also allow the service to obtain additional information about the device being used to authenticate (e.g., device identifiers, parameters, or other aspects), which can be used to further authenticate the device as belonging to the user as well as a further safeguard against inauthentic behavior. Further, the application can provide information to one or both of the third party and the ATM server regarding the time, location, and manner that the first code 205 is being provided to the ATM, which can be used for further authentication by the third party (e.g., to resist a replay attack by verifying that the ATM received the first code 205 within a threshold amount of time of the application providing the first code 205). For instance, the use of an application associated with the third party in the process can resist, or reduce the likelihood, of malicious or inappropriate use (e.g., an intended user having others authenticate for them, thereby sidestepping or compromising the security features as intended or someone impersonating someone else).

In yet other examples, the first code 205 can be received or opened by a mobile application associated with the user's financial institution. The mobile application can be used to manage authentication requests. This can include the mobile application being used to receive and provide codes. In some implementations, the mobile application can be used to revoke authentication to prevent third parties from relying on previously previous authentications (e.g., revoking authentication can include preventing further second codes from being provided by the ATM server, see below). In still further examples, the mobile application can act as a gate-keeper by presenting information represented by the first code to the user (e.g., describing that it is an authentication request by the specific third party, and describing additional disclaimers, warnings, or reassurances) and requesting permission from the user to proceed. Until user permission is received (e.g., from checking a box or pressing a button in the application), then the mobile application may prevent the flow of the method 200 from proceeding to operation 214. In some instances, an additional layer of security is added by, in response to receiving permission from the user, updating the first code 205 to reflect that user permission was received (e.g., by appending information representing permission to the code). The first code 205 can then subsequently be checked for that permission before proceeding to a further step (e.g., a providing second code step, below).

While many examples herein discuss the code as being provided by a user device 100, in addition or instead, the code may be physically delivered to an address associated with the user, such as in the form of a code delivered as part of a postcard, letter, or package. The code embodied on that letter can then be provide to the ATM via operation 214.

Operation 214 includes to provide the first code 205 to the ATM 120.

In an example, operation 214 includes revealing the first code to a security camera associated with the ATM. In an example, the code is encoded in the form of a static or dynamic visual code. In another example, operation 214 includes providing a non-visual code, such as by playing an audio frequency that encodes the first code 205. That audio signal can then be played through speakers of the mobile device 100 such that the audio signal is detectable by a microphone of the ATM or a security system associated therewith.

In another example, operation 214 includes providing the first code via near field communication. For example, the first code may be in the form of a virtual card (e.g., a virtual card, such as a credit card or debit card, that would appear in a mobile wallet of the user device) that is used for sending the code to the ATM. In some examples, the virtual payment card conveying the first code is configured for engaging in financial transactions (e.g., it can be used as a payment instrument). In other examples, the virtual payment card is not configured for engaging in financial transactions (e.g., it may not be used as a payment instrument). In a particular example, the first code may be included in discretionary data or in a reference line included in metadata associated with the near field payment data interchanged between the mobile device and ATM. The first code may be transmitted as part of a zero-dollar transaction or other type of non-funds-transferring data interchange between the mobile device and the ATM. In another example, the first code may be in a format mimicking the kind of data that would be sent over near field communication in a given transaction. For instance, where a payment instrument is mimicked, the data can include one or more of: a card number (typically sixteen digits), expiration date (typically MM/YY format), and CVV security code (typically three or four digits). The data may be invalid for use in processing a payment but may be valid for use in authentication as described herein. Where the ATM is configured to receive the first code through any type of near field communication, then the method can proceed.

Even where the ATM is not specially configured to receive the first code through near field communication, the first code may still be usefully conveyed in order to accomplish the method. For example, the ATM may be configured to receive payment card information through near field communication rather than through the traditional technique of physically inserting the card in a slot. That technique can be overridden by using something that mimics the virtual payment card but is instead meant to provide the first code. Presentment of the first code 205 may not unlock functionality of the ATM but may nonetheless be present in logs associated with the ATM, which can then be analyzed and used to determine that the code was provided to that ATM.

Revealing the code can be performed by the user. The user may access the code on the user device 100, such as by launching an application that has the code. The user can cause the user device 100 to show the code on a display of the user device 100. As described above, the mobile application may prevent the presentation of the code until permission is received from the user. Once the code is being provided presenting, the user can hold the user device 100 in such a way that the representation of the first code 205 is visible to a security camera associated with the ATM 120. In examples, the user can hold up their mobile device so that the screen of the mobile device is facing the security camera. The user can hold the device for an effective amount of time for the first code to be transmitted to the security camera. In some instances, the user receives feedback for when the code has been transmitted. There can be a process on the mobile device monitoring how long the device has been held in that position (e.g., using an accelerometer, gyroscope, or another feature of the device) and using that amount of time to infer whether the security camera ought to have received the code (e.g., by determining that the amount of time is greater than an amount of time that it takes to loop the dynamic code a predetermined number of times). In addition or instead, the mobile device can activate a front facing camera and analyze what is visible to the camera. Image analysis can be applied to the camera feed to determine whether a security camera (or another relevant portion of an ATM) is visible and use that to infer that screen is visible to the security camera and start a timer. In some examples, the mobile application can receive an indication that the code has been received.

In some examples, the code is manually provided to the ATM by the user. For instance, the user device 100 reveals the first code to the user, and the user manually enters the code into the ATM using any of a variety of techniques (e.g., using a keypad of the ATM).

Operation 216 includes the ATM (or a device associated with the ATM and local to the ATM) receiving the first code and providing the first code to the operator of the ATM (e.g., a bank), which then receives the first code in operation 218. The ATM (e.g., via a security system thereof or a security system associated with the ATM). The security system captures information regarding the environment around the ATM and transmits it to a bank server.

Operation 218 includes receiving the first code 205 at the ATM server 150 (or another server or process participating in the authentication). The bank server receives the information at step 218. While this is described as a bank server, it need not be a server of a bank but it can be a server of an entity that provides security or monitoring services for the bank or the ATM to which the first code is provided. The receipt of the first code can happen in any of a variety of ways.

In an example, a program monitors security feeds of the ATM for signals that might encode a code (e.g., by recognizing a pattern associated with codes). When such a signal is detected, it is decoded to receive the first code. This can vary depending on how the first code is provided in operation 214. Where the code is encoded in a visual code (e.g., a bar code, QR code, or another visual matrix), the program can monitor the feed to determine whether such a code is detected. When the code is detected, it can be decoded according to predetermined, traditional techniques (e.g., traditional bar code or QR code decoding technique). Likewise, dynamic visual codes or audio codes can be detected and decoded using predetermined techniques.

In some examples, the mobile application that provides the code in operation 214 assists in the identification of potential codes. For example, the mobile application may send a signal to the associated institution that a code was provided at a particular time, at a particular location, over a particular medium (e.g., visual, auditory, or near field communication), and in a particular format. The computing resources of the institution can then be directed to analyzing security feeds, logs, or other data based on that provided information. That may simplify the problem of analyzing the feeds and reduce computing resources required to do so.

In some examples, the ATM server 150 can perform processing on or based on the first code 205.

For example, as described above, the first code 205 may include indicia of user permission to use authentication. The ATM server 150 can be configured to identify such indicia and proceed with the process in response thereto. The ATM server 150 can be configured to halt the process in response to failing to detect such indicia. In some instances, in response to detecting the first code 205 and in response to detecting that the first code 205 lacks an indicium of permission from the user, the ATM server 150 can request permission from the user (e.g., over a communication channel stored in association with the user at the financial institution, such as email address or phone number). The method 200 can wait to proceed until permission is received or the request times out (e.g., at which point the process is terminated).

Additional processing can include analyzing the first code 205 to determine what kind of information the third party wants to have authenticated, such as the user's legal name, address, phone number, email address, age, account status (joint or individual), other information, or combinations thereof. The ATM server 150 can determine whether there is sufficient permission to authenticate such information and, if so, authenticate the information. Authenticating the information can include comparing information stored in association with the user with information provided in the first code 205 (if any). In addition or instead, such information can be provided by the ATM server 150 at a later stage of the method 200 (e.g., when providing the second code, below).

The server 150 can determine from the first code 205 a medium over which the third party wants to receive the second code. The server 150 can store that information and proceed accordingly in future operations. For example, a portion of the first code 205 may identify the third party, and the server 150 may have pre-stored preferences regarding the manner of communication requested by the third party to receive the second code. Or, a portion of the first code 205 may explicitly define the medium over which the third party wants to receive the second code, and optionally may include communication or contact details associated with that third party.

The server can determine whether the third party is authorized to participate in the authentication process. This can include determining whether the first code 205 includes a valid license key. If so, then the process can continue. Otherwise, the process can terminate.

Following operation 218, the flow of the method 200 can move to operation 220.

At operation 220, the bank server generates a second code 221. The second code 221 can be generated in any of a variety of ways. In an example, the second code 221 is generated by signing the received first code 205 with a private key corresponding to the ATM associated with the received first code 205.

In another example, the first code 205 is combined with an identifier of the user. For instance, the user may have authenticated with the ATM in operations 208 and 210. As part of operation 220, the program can determine whether a user authenticated with the ATM within a predetermined amount of time of the first code being provided to the ATM. If that predetermined amount of time is satisfied, then it can be determined that the user that is logged into the ATM is the one associated with the first code 205. In some examples, the identifier of the user is hashed prior to combining with the first code. Doing so can preserve the anonymity of the user and can also be used later by the third party to verify that one person is not creating or signing on behalf of multiple accounts. In some examples, the first code 205 is combined with other data requested by the third party and provided by the ATM server 150. In some examples, the operations 208 and 210 are performed without performing a financial transaction using the ATM. In other examples, the ATM is used for a financial transaction without a party to that financial transaction engaging in an authentication process described herein.

At operation 222, the bank server can provide the second code 221. The second code 221 can be provided in any of a variety of ways.

In an example, the second code 221 is published to a publicly accessible location, such as a website. In an example, the second code 221 is published to a blockchain. In another examples, the second code 221 is stored in a database or another data structure and is provided by the server over an application programming interface (API) in response to a specific call. For instance, the third party can send an API request asking for a second code associated with a provided first code 205. The server can then lookup the second code 221 via the first code 205 and provide the second code over the API to the requesting third party. In some examples, the ATM server 150 calls an API associated with the requesting third party and provides the second code over that API. In some examples, the medium over which the second code is to be provided is specified by the third party in the first code 205.

At operation 224, the third party receives the second code 221. The third party can receive the second code in any of a variety of ways depending on how the bank server provided the second code in operation 222. Where the bank published the code 221 in a public location, the third party can access that location and retrieve the code. Where the second code 221 is published to a blockchain, the third party can monitor or crawl the blockchain to retrieve the second code 221. Where the second code 221 is provided over an API, the third party can access the API and retrieve the second code 221 over the API. The third party can retrieve the second code 221 based on information known about the user, including based on the first code 207 itself.

At operation 226, the third party uses the received second code 221. The third party can determine that the second code 221 includes the first code 205 associated with the user. Thus, the third party can then determine that the second code 221 can be used to authenticate the user associated with the first code. The third party can use the second code in any of a variety of ways. For example, the third party can break apart the second code 221 into useful components. For instance, where the second code includes an identity of the user or other requested information, that portion can be broken out. The second code 221 may include a portion indicating a signature of the ATM or bank. The third party can validate the signature of the ATM or the bank. If validated, then the third party can then lookup the location of the signing ATM (e.g., in a lookup table or using an API provided by the bank or another entity) and use that location use the location of the ATM as a known location of the user. In some examples, the location of the user device 100 at the time the first code was presented is determined and compared with the location of the signing ATM. If the locations are sufficiently different, then an error can be thrown (e.g., and require the user authenticate at a different ATM). In some examples, the location of the user device 100 is encoded in the first code. In another example, the location of the user device 100 is obtained by a mobile application used to generate or present the first code. That mobile application can then send the location to the third party or elsewhere. The location of the user device 100 can be determined in any of a variety of ways using traditional techniques, such as satellite-based location determination, cell-tower-based location determination, based on nearby wireless signals (e.g., nearby wireless access points), other techniques, or combinations thereof.

In some examples, the location of the ATM is compared with a previously known or recorded location of the user, such as the "home" location that the user specified when they registered with the third party. That distance can be used as a factor in account safety or fraud determinations. For instance, if the user's distance is significantly far away from a known "home" location for the user, then it may be an indication that a fraudster is attempting to impersonate the user. Some features provided by the third party can be limited based on geography and the confirmation of the location of the user can be used as a signal to activate location based features for the user. The verification can be used as an indication to reset a password for an account of the user with the third party. The key used to sign the second code 221 can be compared with an allowlist to verify that the signature came from an approved signer. The key used to sign the second code 221 can be compared with a predetermined denylist and can be rejected for use if the signer is on the denylist. In some instances, the information provided as part of this process can be used to verify an age of the user or verify that the age of the user is at or above a particular age (e.g., older than 13, 16, or 18 years old or another relevant age).

The identifier of the user can be used as part of the enhanced security process. For example, where the identifier is not obfuscated, then the identifier of the user can be compared with an identity of the user provided to the third party. If the identifiers sufficiently match, then this can be used as an indication that the user is who they say they are. If the identifiers don't match, then a remediation can occur. This can include flagging the user's account for higher security scrutiny, denying certain permissions to the account, other actions, or combinations thereof.

Even where the identifier is obfuscated (e.g., hashed), the identifier can be used to improve security or reliability of the system. For example, the identifier can be compared to a denylist and, if the identifier is present on that list, a remediation can take place. For example, a fraud flag can be added. The identifier can be compared with logs stored by the third party or others to see whether the identifier has been used more than a threshold number of times. If a single identifier is used to authenticate too many accounts (more than that predetermined threshold), then that may be an indication that the identifier is being used fraudulently.

Additional Uses

While many examples herein are discussed within the context of ATMs, they need not be so limited. For example, many other physical locations have security systems which can be used to detect codes. Any of them may be used in addition to or instead of ATM machines. In some examples, the security systems are used in areas of restricted access (e.g., only people having certain levels of clearance are allowed in). The presence of an individual in such an area can be used to infer certain things about the individual.

While examples herein include a user providing the first code through a process associated with an ATM, in other implementations, the ATM can be configured to provide the first code to the user, such as by displaying the code on a display of the ATM or by printing a receipt having the code printed thereon. The user device can then provide that code to the third-party server as part of a verification process. In such an example, operations indicated as being performed by the ATM 120 can be performed by the user device 100 and vice versa.

Computing Environment

Figure 3:
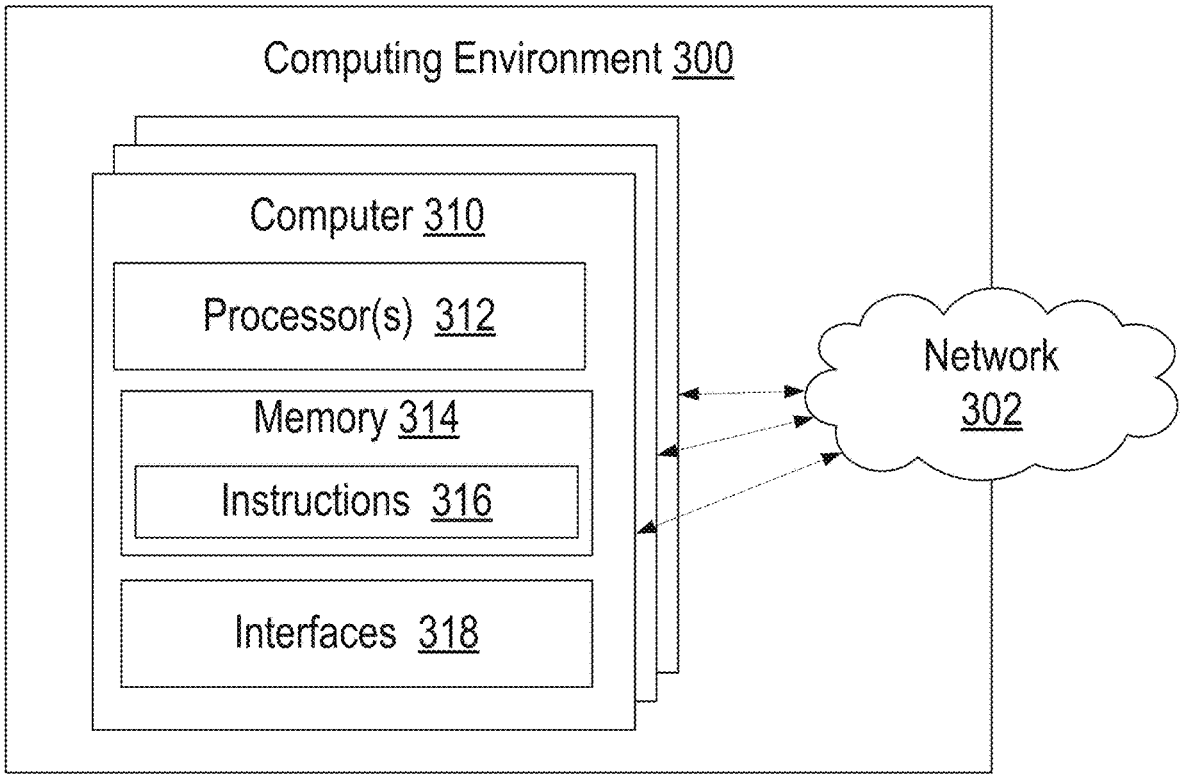
FIG. 3 illustrates an example computing environment.

FIG. 3 discloses a computing environment 300 in which aspects of the present disclosure may be implemented. A computing environment 300 is a set of one or more virtual or physical computers 310 that individually or in cooperation achieve tasks, such as implementing one or more aspects described herein. The computers 310 have components that cooperate to cause output based on input. Example computers 310 include desktops, servers, mobile devices (e.g., smart phones and laptops), wearables, virtual/augmented/expanded reality devices, spatial computing devices, virtualized devices, other computers, or combinations thereof. In particular example implementations, the computing environment 300 includes at least one physical computer.

The computing environment 300 may specifically be used to implement one or more aspects described herein. In some examples, one or more of the computers 310 may be implemented as a user device, such as mobile device and others of the computers 310 may be used to implement aspects of a machine learning framework useable to train and deploy models exposed to the mobile device or provide other functionality, such as through exposed application programming interfaces.

The computing environment 300 can be arranged in any of a variety of ways. The computers 310 can be local to or remote from other computers 310 of the environment 300. The computing environment 300 can include computers 310 arranged according to client-server models, peer-to-peer models, edge computing models, other models, or combinations thereof.

In many examples, the computers 310 are communicatively coupled with devices internal or external to the computing environment 300 via a network 302. The network 302 is a set of devices that facilitate communication from a sender to a destination, such as by implementing communication protocols. Example networks 302 include local area networks, wide area networks, intranets, or the Internet.

In some implementations, computers 310 can be general-purpose computing devices (e.g., consumer computing devices). In some instances, via hardware or software configuration, computers 310 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 310 include one or more processors 312, memory 314, and one or more interfaces 318. Such components can be virtual, physical, or combinations thereof.

The one or more processors 312 are components that execute instructions, such as instructions that obtain data, process the data, and provide output based on the processing. The one or more processors 312 often obtain instructions and data stored in the memory 314. The one or more processors 312 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 312 include at least one physical processor implemented as an electrical circuit. Example providers of processors 312 include INTEL, AMD, QUALCOMM, TEXAS INSTRUMENTS, and APPLE.

The memory 314 is a collection of components configured to store instructions 316 and data for later retrieval and use. The instructions 316 can, when executed by the one or more processors 312, cause execution of one or more operations that implement aspects described herein. In many examples, the memory 314 is a non-transitory computer readable medium, such as random access memory, read only memory, cache memory, registers, portable memory (e.g., enclosed drives or optical disks), mass storage devices, hard drives, solid state drives, other kinds of memory, or combinations thereof. In certain circumstances, transitory memory 314 can store information encoded in transient signals.

The one or more interfaces 318 are components that facilitate receiving input from and providing output to something external to the computer 310, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 318 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 318 can facilitate connection of the computing environment 300 to a network 390.

The computers 310 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Machine Learning Framework

Figure 4:
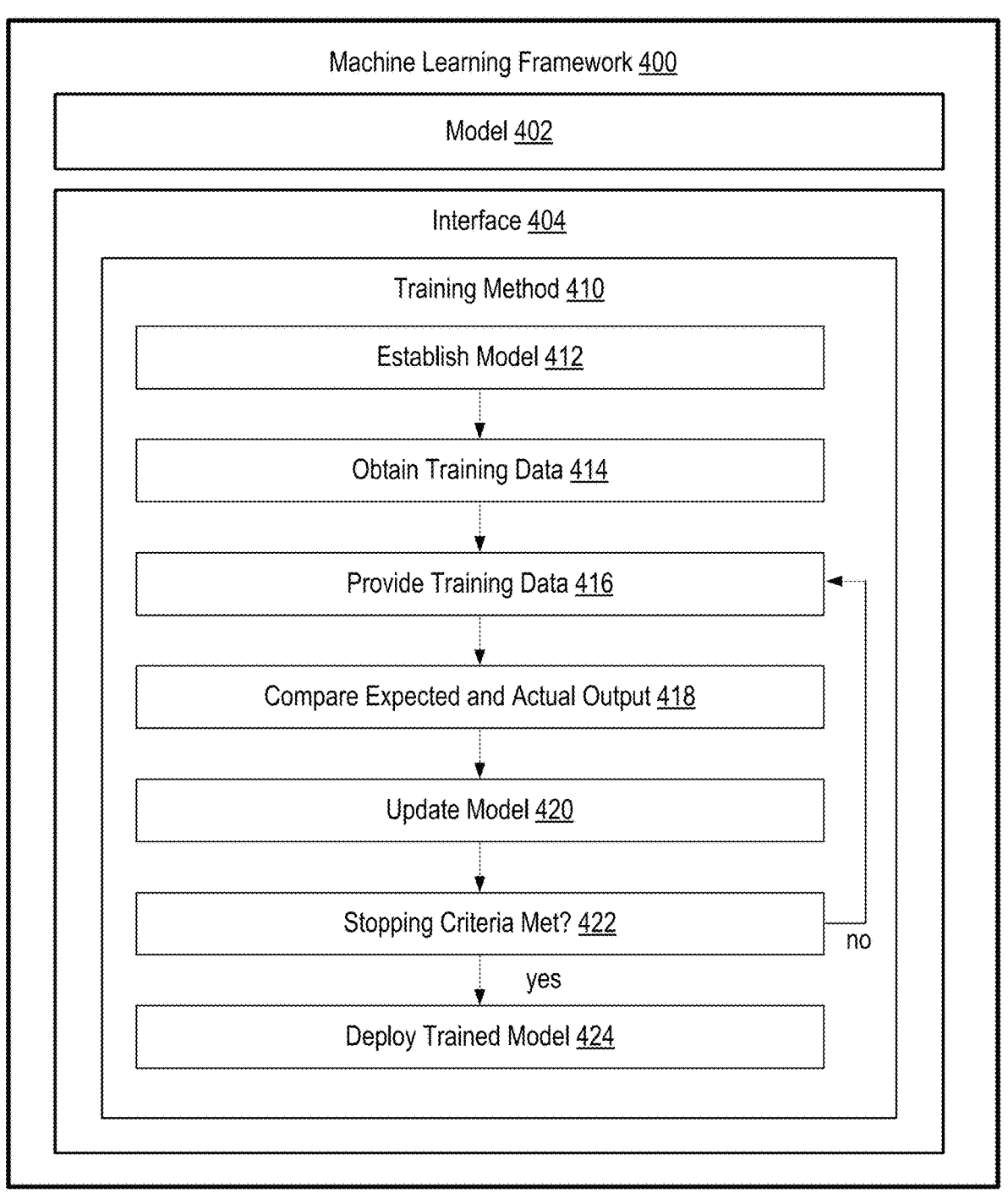
FIG. 4 illustrates an example machine learning framework.

FIG. 4 illustrates an example machine learning framework 400 that techniques described herein may benefit from or improve on. A machine learning framework 400 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 400 or components thereof are often built or refined from existing frameworks, such as TENSORFLOW by GOOGLE, INC. or PYTORCH by the PYTORCH community.

The machine learning framework 400 can include one or more models 402 that are the structured representation of learning and an interface 404 that supports use of the model 402.

The model 402 can take any of a variety of forms. In many examples, the model 402 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 402 can include a representation of memory (e.g., providing long short-term memory functionality). Where the set includes more than one model 402, the models 402 can be linked, cooperate, or compete to provide output.

The interface 404 can include software procedures (e.g., defined in a library) that facilitate the use of the model 402, such as by providing a way to establish and interact with the model 402. For instance, the software procedures can include software for receiving input, preparing input for use (e.g., by performing vector embedding, such as using Word2Vec, BERT, or another technique), processing the input with the model 402, providing output, training the model 402, performing inference with the model 402, fine tuning the model 402, other procedures, or combinations thereof.

In an example implementation, interface 404 can be used to facilitate a training method 410 that can include operation 412. Operation 412 includes establishing a model 402, such as initializing a model 402. The establishing can include setting up the model 402 for further use (e.g., by training or fine tuning). The model 402 can be initialized with values. In examples, the model 402 can be pretrained. Operation 414 can follow operation 412. Operation 414 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 402. Operation 416 can follow operation 414. Operation 416 includes providing a portion of the training data to the model 402. This can include providing the training data in a format usable by the model 402. The framework 400 (e.g., via the interface 404) can cause the model 402 to produce an output based on the input. Operation 418 can follow operation 416. Operation 418 includes comparing the expected output with the actual output. In an example, this can include applying a loss function to determine the difference between expected and actual. This value can be used to determine how training is progressing. Operation 420 can follow operation 418. Operation 420 includes updating the model 402 based on the result of the comparison. This can take any of a variety of forms depending on the nature of the model 402. Where the model 402 includes weights, the weights can be modified to increase the likelihood that the model 402 will produce correct output given an input. Depending on the model 402, backpropagation or other techniques can be used to update the model 402. Operation 422 can follow operation 420. Operation 422 includes determining whether a stopping criterion has been reached, such as based on the output of the loss function (e.g., actual value or change in value over time). In addition or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 414. If the stopping criterion has been satisfied, the flow can move to operation 424. Operation 424 includes deploying the trained model 402 for use in production, such as providing the trained model 402 with real-world input data and produce output data used in a real-world process. The model 402 can be stored in memory 314 of at least one computer 310, or distributed across memories of two or more such computers 310 for production of output data (e.g., predictive data).

Application of Techniques

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A method comprising:

at a set of one or more third party servers associated with a third party:

determining to require authentication of a second party;

responsive to determining to require authentication of the second party, generating a first code; and providing the first code to a mobile device of the second party;

at the mobile device of the second party:

receiving the first code; and providing the first code on a screen of the mobile device;

at a security camera associated with a secure device at a fixed location:

capturing an image of a portion of the screen of the mobile device while the screen of the mobile device is facing the security camera and while the screen of the mobile device is showing the first code generated by the third party; and providing the image of the first code to a secure device server set as part of a security feed;

at a secure device server set comprising one or more secure device servers of a first party:

receiving the security feed from the security camera;

monitoring the security feed to identify images that may contain a code;

detecting the first code within the provided image, wherein the image includes the portion of the screen of the mobile device while the screen of the mobile device is facing the security camera and while the screen of the mobile device is showing the first code generated by the third party;

responsive to detecting the first code, generating a second code based on the first code; and transmitting the second code to the third party;

at the set of one or more third party servers:

receiving the second code from the first party; and determining to authenticate the second party based on the second code.

2. A method comprising:

at a secure device server set comprising one or more secure device servers of a first party:

receiving a security feed from a security camera associated with a secure device;

monitoring the security feed to identify images that may contain a code;

detecting a first code within an image, wherein the image includes a portion of a screen of a mobile device of a second party that is facing the security camera and wherein the screen is showing a first code generated by a third party responsive to determining to require authentication of the second party;

responsive to detecting the first code:

identifying in the first code at least one of:

indicia of user permission to use authentication:

information of the second party requested to be authenticated by the third party; or identification of a communication channel to be used for communication with the third party; and generating a second code based on the first code; and transmitting the second code to the third party, thereby fulfilling the authentication of the second party, wherein transmitting the second code to the third party includes at least one of:

publishing the second code on a blockchain;

providing the second code in response to an application programming interface call from the third party; or providing the second code via an application programming interface call to the third party.

3. The method of claim 2, wherein the first code is encoded in a dynamic visual code.

4. The method of claim 3, wherein the dynamic visual code has colors or brightness that change over time to encode the first code.

5. The method of claim 2, wherein the second code includes the first code.

6. The method of claim 2, wherein the first code includes an identifier of the second party.

7. The method of claim 2, wherein the portion of the screen that is showing the first code is showing the first code within a mobile application associated with the third party running on the mobile device of the second party.

8. The method of claim 2, wherein generating the second code includes signing with a private key associated with the secure device.

9. The method of claim 2, wherein generating the second code includes:

determining whether a user authenticated with the secure device within a predetermined amount of time of the first code being provided to the secure device; and including an identifier of the user or a hash of an identifier of the user with the second code.

10. The method of claim 2, wherein the first code was generated responsive to determining to require authentication of the second party based on:

detecting a login request from the second party;

detecting a create account request from the second party;

detecting a change to security or privacy settings from the second party;

detecting a change to payment or billing settings;

detecting a password recovery request from the second party;

detecting an account deletion request from the second party;

detecting a request to add another device to an account;

detecting potential fraud in relation to an account of the second party;

detecting potential misuse of an account of the second party;

detecting inauthentic behavior with an account of the second party;

detecting an unusual login location for the second party;

detecting a request requiring a second party be in a particular location; or determining to verify an age of the second party.

11. The method of claim 2, wherein the secure device is an automated teller machine.

12. A method comprising:

at a third-party server associated with a third party:

determining to require authentication of a second party;

responsive to determining to require authentication of the second party, generating a first code, the first code including at least one of:

indicia of user permission to use authentication;

information of the second party requested to be authenticated by the third party; or identification of a communication channel to be used for communication with the third party;

providing a displayable representation of the first code to a mobile device of the second party;

receiving a second code from a first party;

determining a location of a device of the first party to which the first code was communicated by the second party;

determining to authenticate the second party based on the second code and the location, wherein the first code was generated responsive to determining to require authentication of the second party based on:

detecting a login request from the second party;

detecting a create account request from the second party;

detecting a change to security or privacy settings from the second party;

detecting a change to payment or billing settings;

detecting a password recovery request from the second party;

detecting an account deletion request from the second party;

detecting a request to add another device to an account;

detecting potential fraud in relation to an account of the second party;

detecting potential misuse of an account of the second party;

detecting inauthentic behavior with an account of the second party;

detecting an unusual login location for the second party;

detecting a request requiring a second party be in a particular location; or determining to verify an age of the second party.

13. The method of claim 12, wherein receiving the second code from the first party includes:

obtaining the second code from a blockchain to which the first party published the second code:

receiving the second code via an application programming interface call from the first party; or making an application programming interface call to the third party regarding the second code.

14. The method of claim 12, wherein the determining to authenticate the second party is based on a location of a device to which the first code was communicated.

15. The method of claim 14, wherein determining to authenticate the second party includes deriving the first code from the second code.

16. The method of claim 12, further comprising:

providing the first code via an application of the third party running on the mobile device of the second party.

* * * * *